US006547014B2

(12) United States Patent
McCallops et al.

(10) Patent No.: US 6,547,014 B2
(45) Date of Patent: Apr. 15, 2003

(54) PNEUMATIC TOOL HOUSINGS HAVING EMBEDDED ELECTRONIC DEVICES

(75) Inventors: John A. McCallops, Easton, PA (US); Kurt E. Ashbaugh, Easton, PA (US); Mark J. Hamlin, Boonton, NJ (US); Kevin Heinrichs, Lopatcong, NJ (US); Douglas E. Souls, Hackettstown, NJ (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 09/783,898

(22) Filed: Feb. 15, 2001

(65) Prior Publication Data

US 2002/0108765 A1 Aug. 15, 2002

(51) Int. Cl.[7] .................................... B23B 45/00
(52) U.S. Cl. .................................... 173/169; 173/168
(58) Field of Search .................................... 173/168, 169; 310/47, 50

(56) References Cited

U.S. PATENT DOCUMENTS

| | | | | |
|---|---|---|---|---|
| 4,175,247 A | * 11/1979 | Klemm | 310/50 |
| 5,627,361 A | 5/1997 | Lee | 235/472 |
| 5,742,238 A | 4/1998 | Fox | 340/825.49 |
| 5,828,825 A | 10/1998 | Eskandari et al. | 395/183.03 |
| 5,898,379 A | 4/1999 | Vanbergeijk | 340/680 |
| 6,036,101 A | 3/2000 | Hass et al. | 235/492 |
| 6,104,095 A | 8/2000 | Shin et al. | 257/787 |
| 6,115,763 A | 9/2000 | Douskey et al. | 710/72 |
| 6,145,069 A | 11/2000 | Dye | 711/170 |
| 6,150,921 A | 11/2000 | Werb et al. | 340/10.1 |
| 6,220,496 B1 | * 4/2001 | Hirai et al. | 227/130 |

OTHER PUBLICATIONS

Dallas Semiconductor Corp: Automatic Information Overview, Copyright© 2000 Dallas Semiconductor Corp.—2 pages.

Dallas Semiconductor Corp: Automatic Information Products, p. 8 of 10, undated.

Dallas Semiconductor DS2506, 64–kbit Add–Only Memory, Jun. 21, 2000, 25 Pages.

* cited by examiner

*Primary Examiner*—Scott A. Smith
*Assistant Examiner*—Nathaniel Chukwurah
(74) *Attorney, Agent, or Firm*—Michael Best & Friedrich LLP

(57) ABSTRACT

A pneumatic tool housing is provided having storage for an embedded electronic device. The pneumatic tool has a gas inlet for supplying a motive gas stream to the tool and an exhaust outlet for exhausting the motive gas stream from the tool. A compartment is provided for an electronic device wherein the compartment is in fluid communication with at least a portion of the motive gas stream. Also provided is a pneumatic tool housing having storage for an embedded electronic device with a compartment for an electronic device having at least one electrical lead wherein the compartment is covered by a component part of the pneumatic tool during operation.

16 Claims, 9 Drawing Sheets

PNEUMATIC TOOL HOUSINGS HAVING EMBEDDED ELECTRONIC DEVICES

BACKGROUND OF THE INVENTION

Pneumatic power tools are commonly used in factories due to their durability and dependability. Examples of such power tools include nut runners and impact tools used to tighten threaded fasteners. One of the advantages of pneumatic tools is that they require only a simple connection to an air line to be operational. With their popularity in industry, the number of pneumatic tools in factories has increased. This increased number of tools in factories has caused a problem with tracking them for performing calibration cycles, preventative maintenance, and warranty purposes. Typically these tools are serialized by stamping serial numbers into a metallic surface on the tool, or in some cases by hot stamping the serial number onto a plastic housing surface. This identification method suffers from the attendant problem that over time the surface of the tool housing wears away making the numbers unreadable over time. Moreover, using this physical identification method requires maintaining records associated with these individual tools to be stored separate from the tools themselves.

It is known to use electronic devices such as semiconductor memory chips (also known as "e-chips") as computer-readable. labels also known as "silicon labels." Examples of such chips and their reading tools are shown in U.S. Pat. Nos. 5,627,361 and 6,036,101, the disclosures of which are incorporated herein by reference. The e-chip can be programmed with relevant information pertaining to an object and, when attached to that object, can serve as electronic labels. In this manner, identification/serial numbers, manufacturing and maintenance histories, revision status, and other important information can be stored, carried, and changed while located on the products to which they are attached. Most often, these e-chips are packaged as modules or tokens that are mounted on a product with the electrical leads of the token being positioned so that they can be easily contacted by the user with a reading device, such as a wand. This frequently results in the electrical leads of the e-chip being exposed to the environment in between readings.

In contemplating the use of e-chips or other electronic devices mounted on tools for use in an industrial environment, however, the inventors of the present invention have realized that prior to electronically reading any such chip, a user of the tool would have to clean the electrical leads to prevent any accumulated dust, dirt, or other contaminants precipitated by the industrial environment from hindering the exposed electrical leads from making contact with an electronic reading device.

The foregoing illustrates limitations known to exist in using semiconductor devices in present pneumatic devices. Thus it is apparent that it would be advantageous to provide an alternative directed to overcoming one or more of the limitations set forth above. Accordingly alternative pneumatic tool housings having embedded electronic devices are provided including the features more fully disclosed hereinafter.

SUMMARY OF THE INVENTION

According to a preferred embodiment of the present invention, a pneumatic tool housing is provided having storage for an embedded electronic device. The pneumatic tool has a gas inlet for supplying a motive gas stream to the tool and an exhaust outlet for exhausting the motive gas stream from the tool. A compartment is provided for an electronic device wherein the compartment is in fluid communication with at least a portion of the motive gas stream. In another preferred embodiment according to the present invention, a pneumatic tool housing having storage for an embedded electronic device is provided having a compartment for an electronic device having at least one electrical lead wherein the compartment is covered by a component part of the pneumatic tool during operation.

The foregoing and other aspects will become apparent from the following detailed description of the invention when considered in conjunction with accompanying drawing figures.

DETAILED DESCRIPTION OF THE PREFERRED EMBODIMENTS

Figure 1:
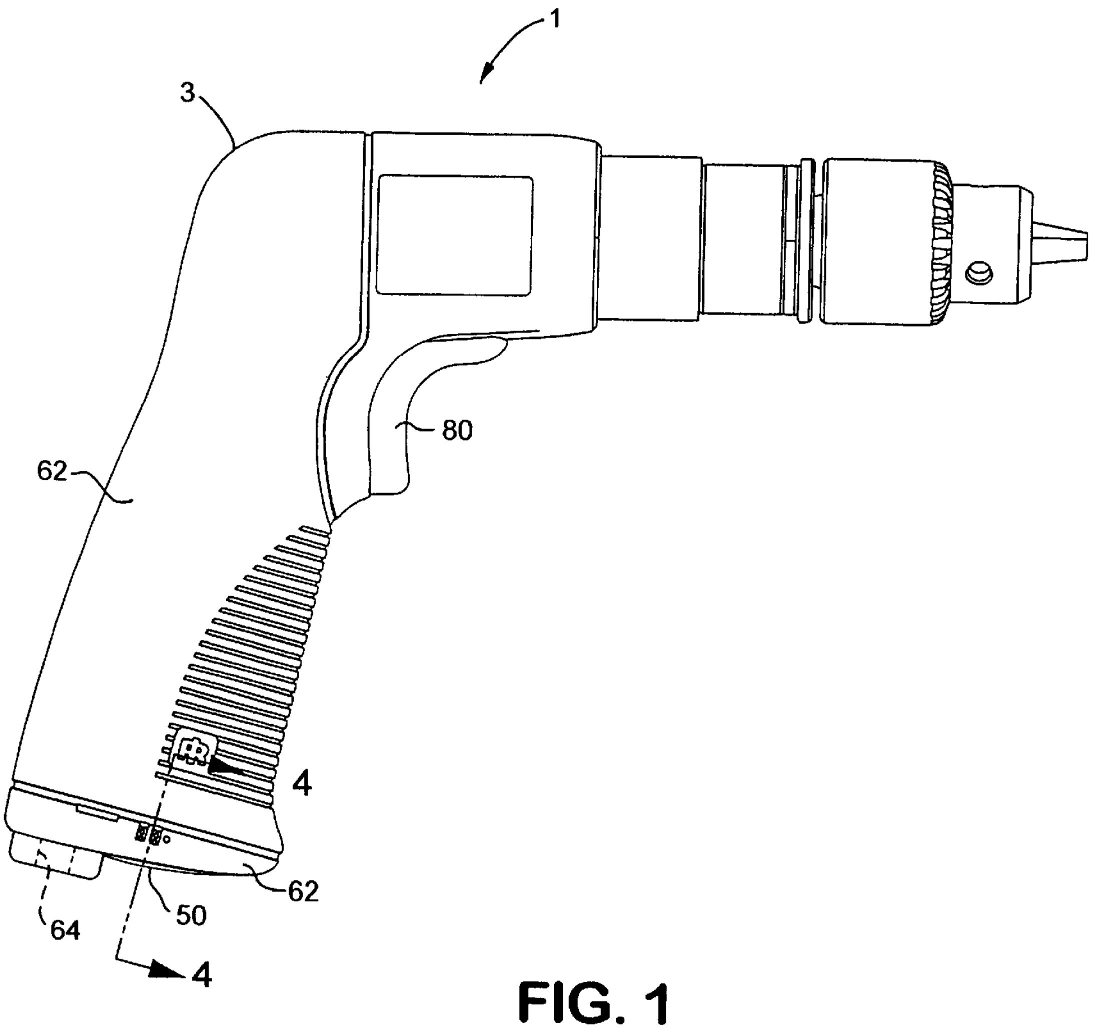
FIG. 1 is a side view showing a preferred embodiment of a pneumatic tool incorporating a pneumatic tool housing having an embedded semiconductor chip according to the present invention.

The invention is best understood by reference to the accompanying drawings in which like reference numbers refer to like parts. It is emphasized that, according to common practice, the various dimensions of the pneumatic tools and associated tool parts as shown in the drawings are not to scale and have been enlarged for clarity.

As used herein, the term "electronic device" means a device having electronic components and/or circuitry and having at least one electrical lead for electrical connection and includes semiconductor devices. The term "semiconductor device" means an electronic device having one or more electronic components, including integrated circuits thereof and semiconductor chips, that are capable of information storage, retrieval, and/or processing and includes, but is not limited to, memory or diagnostic devices such as electronic chips also known as "e-chips."

Figure 2:
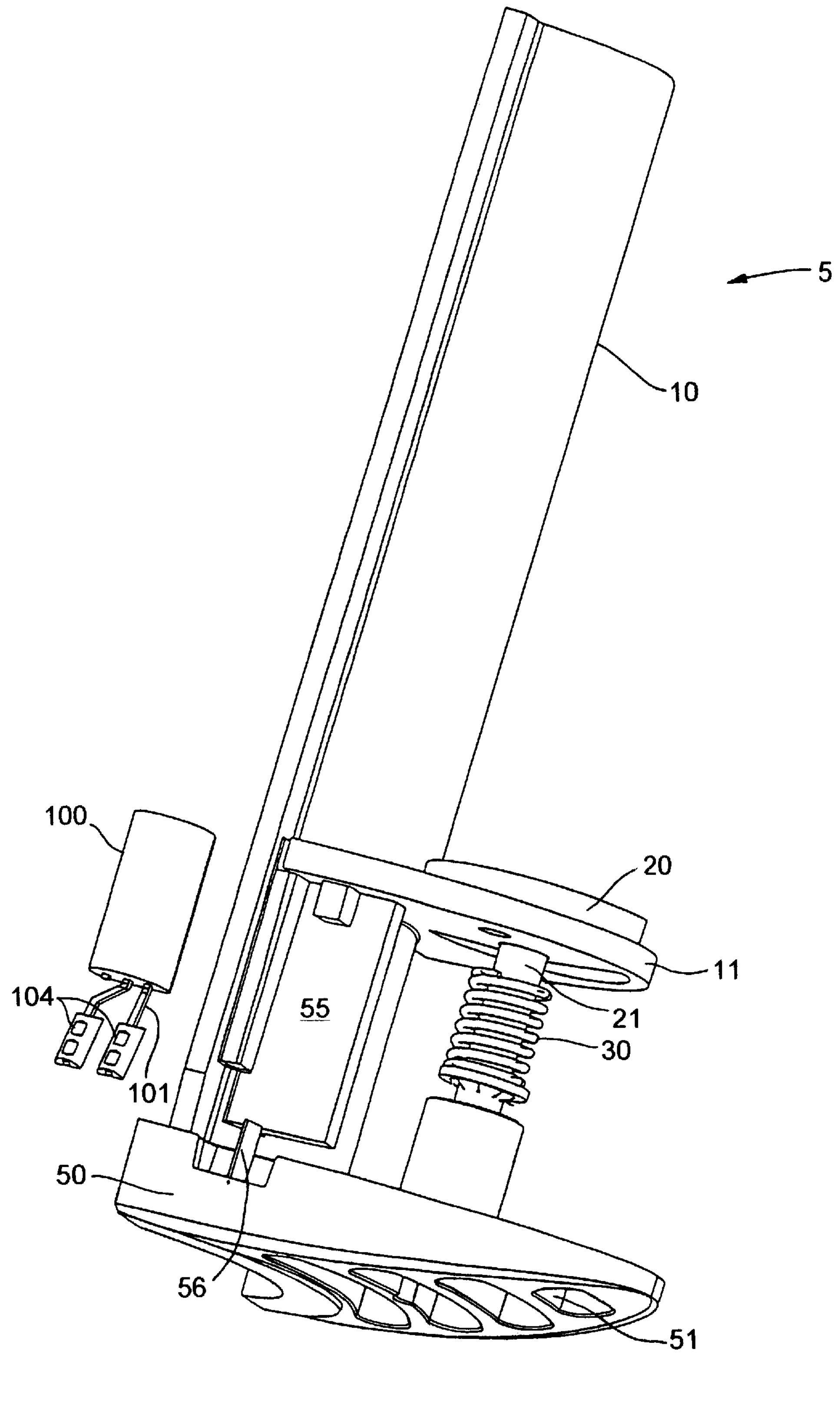
FIG. 2 is a side elevational view of an exemplary speed regulating apparatus of the pneumatic tool shown in FIG. 1 according to the present invention with a semiconductor chip prior to installation therein.
Figure 9:
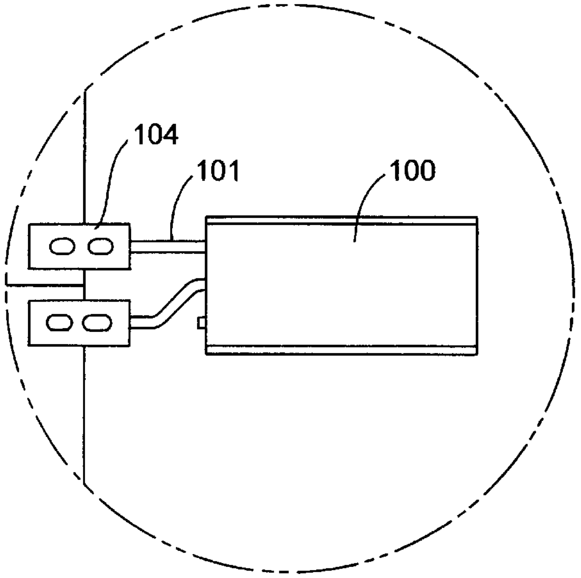
FIG. 9 is an enlarged view showing the semiconductor chip illustrated in the circled portion of FIG. 7.
Figure 10:
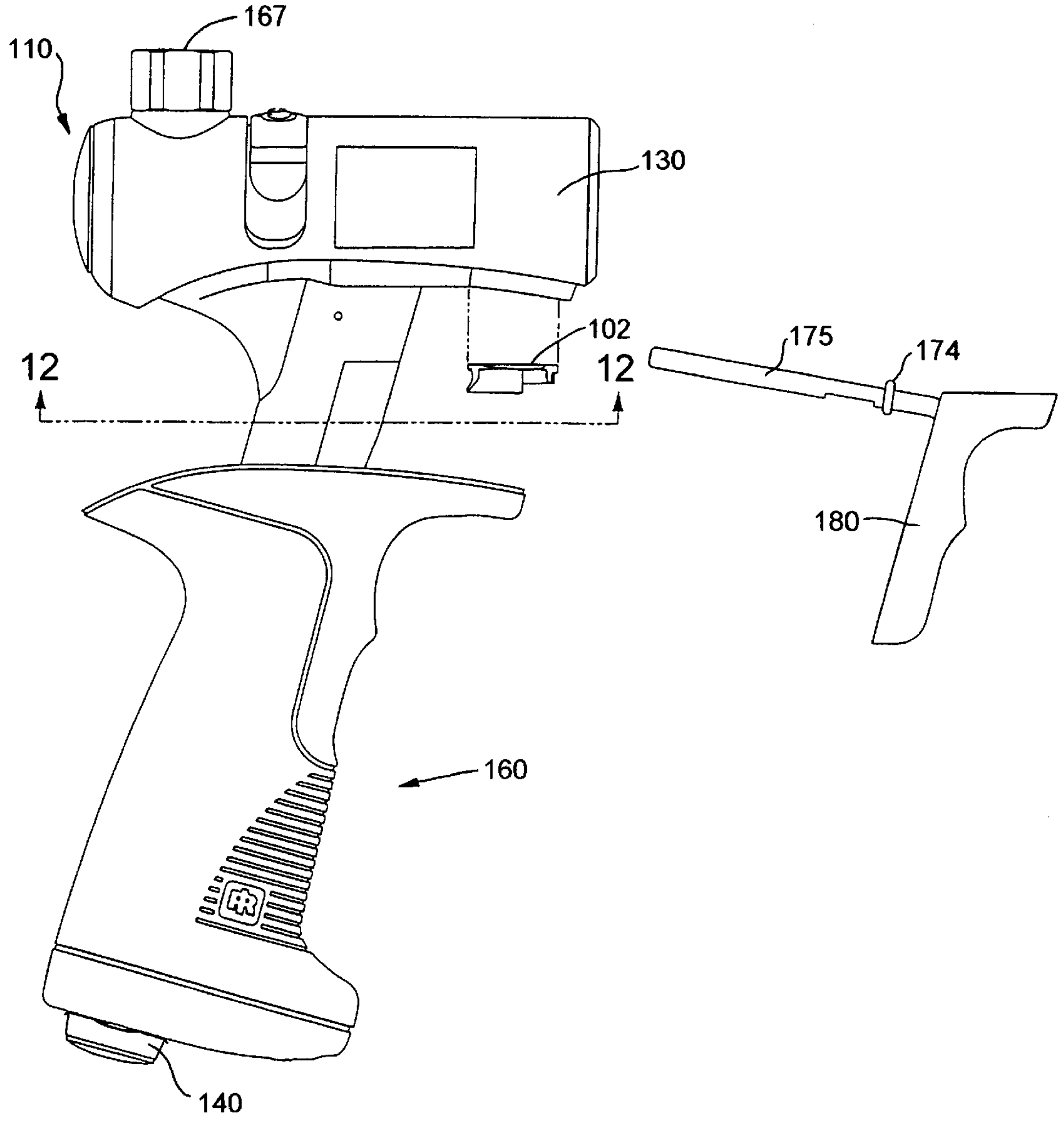
FIG. 10 is an exploded side view showing another embodiment of a pneumatic tool incorporating a pneumatic tool housing and semiconductor chip carrying apparatus therefor according to a preferred embodiment of the present invention.
Figure 11:
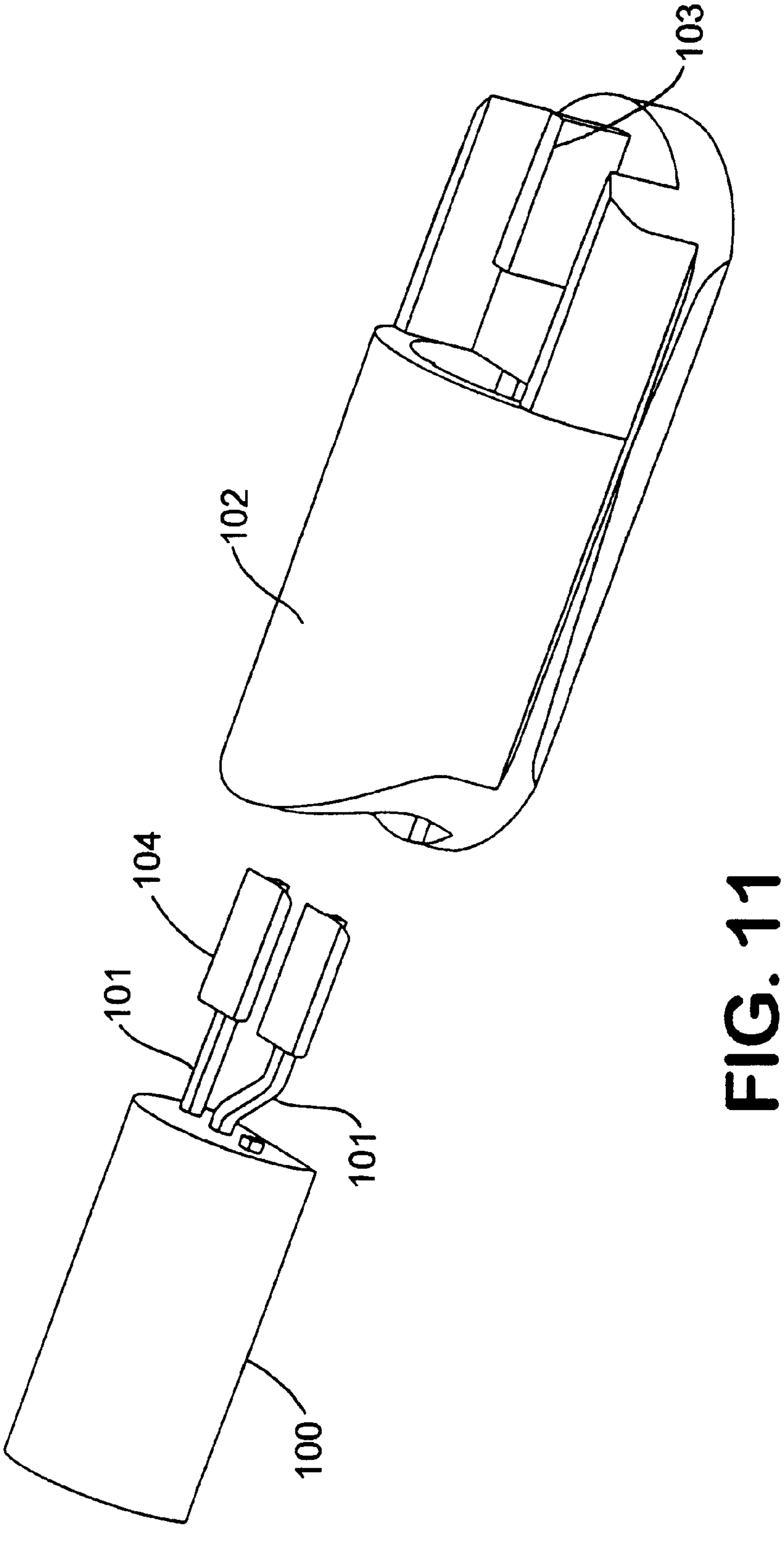
FIG. 11 is an elevational view of the semiconductor chip carrying apparatus shown in FIG. 11 with a semiconductor chip prior to installation therein.

Referring now to the drawings, shown in FIGS. 2, 9 and 11 are close-up views of an electronic device 100 having electrical input/output leads 101 used in the preferred embodiments according to the present invention. In the preferred embodiments of the present invention described below, shown and described as the electronic device is a model DS2506 semiconductor electronic chip or "e-chip" available from Dallas Semiconductor Corporation, Dallas, Tex., in which two-of the three leads, the ground and data leads, are used for inputting and outputting data pertaining to the tools, which data can include serial numbers, maintenance histories, or other data. The third "NC" lead normally provided in the e-chip is removed and the middle lead is bent as shown to space it from the remaining lead. To facilitate electrical contact while reading and writing to the e-chip, electrical contact portions 104 which, preferably, are ferrules crimped to each lead 101 as shown by cutting the leads to length for insertion into the ferrule and then crimping the ferrule to the leads using a tool capable of attaching ferrules to the leads. Such modification of the terminal leads and the crimping tools therefore is well within the purview of those skilled in the art. Although shown and described below with respect to semiconductor e-chips that are used as silicon labels, it is understood that the present invention is not limited to such devices but can include any electronic device for use on-board a pneumatic tool, including diagnostic and data gathering/processing devices or energy storage devices such as an auxiliary battery.

Shown in FIGS. 1–4 is an exemplary first embodiment of an electronic device 100 embedded in the housing of a handheld pneumatic power tool 1. Pneumatic power tool 1 has a housing 3 with a handle 62 in the form of a pistol grip that preferably includes a speed regulating apparatus 5 located therein. The reference numbers of the component parts of pneumatic tool 1 and speed regulating apparatus 5 correspond in number and in their operation to those shown and described in commonly assigned and co-pending U.S. patent application Ser. No. 09/501,927, the disclosure of which is incorporated herein by reference. In brief summary, pneumatic tool 1 driven by a motive gas stream supplied by a gas inlet 64 controlled by an operating trigger 80. Pneumatic tool 1 includes a motor (not shown) which, preferably, is a vane motor for producing rotary output for an output spindle. The exhaust fluid from the vane motor, which in the case of a pneumatic tool is air, exits the motor chamber and, in turn, pneumatic tool 1 via an exhaust outlet comprising exhaust ports 51 provided in an exhaust butt plate 50. A speed regulating apparatus 5 having an exhaust control plate 20 held in tension by a post 21 and spring 30 arrangement against a mounting bracket 11 attached to a center wall 10 as described in detail in copending U.S. patent application Ser. No. 09/501,927, is preferably provided for controlling the speed of the tool by varying the flow rate of the air exiting the tool.

Figure 3:
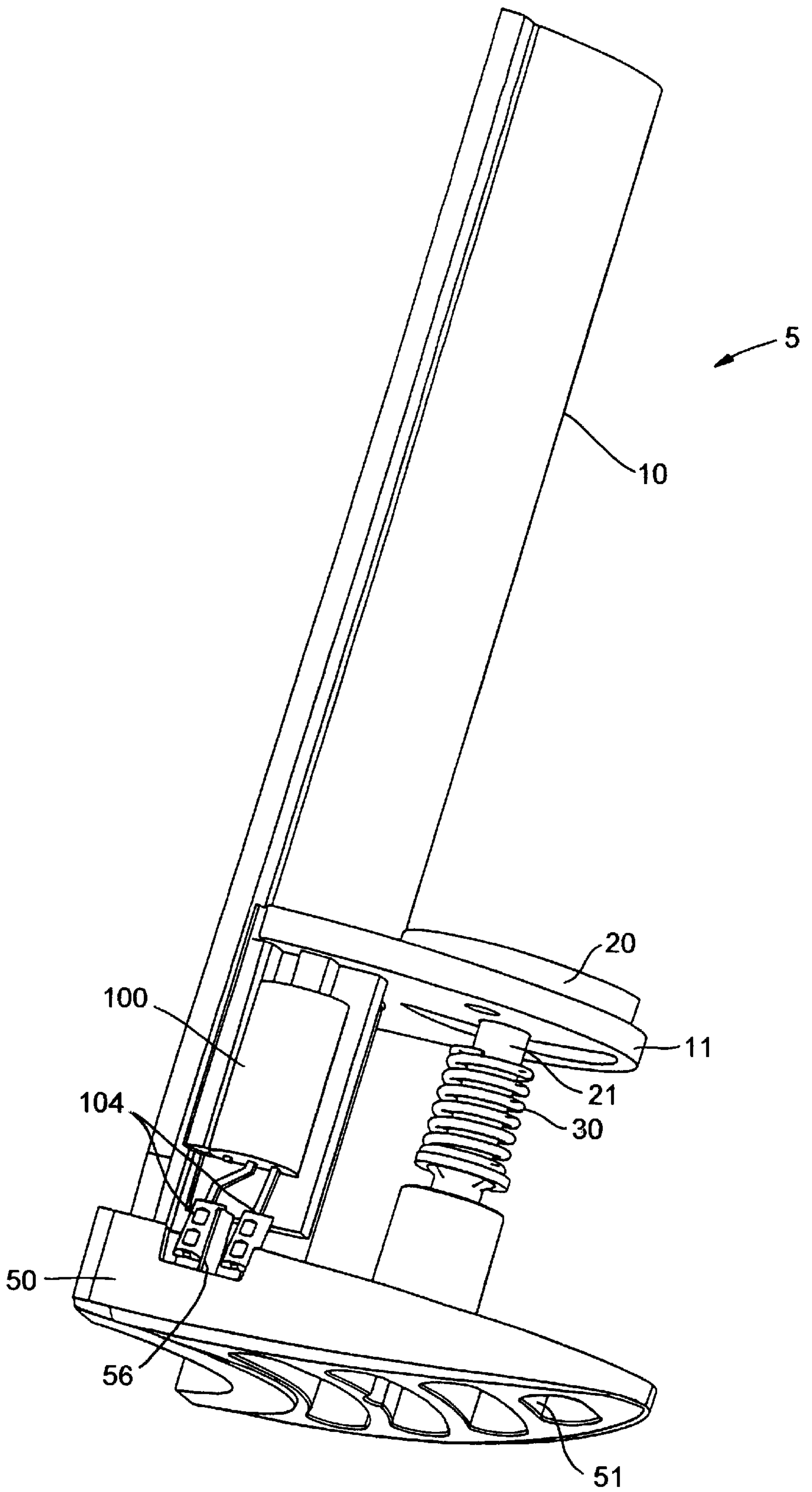
FIG. 3 is a side elevational view of an exemplary speed regulating apparatus shown in FIG. 2 with a semiconductor chip installed according to the present invention.
Figure 4:
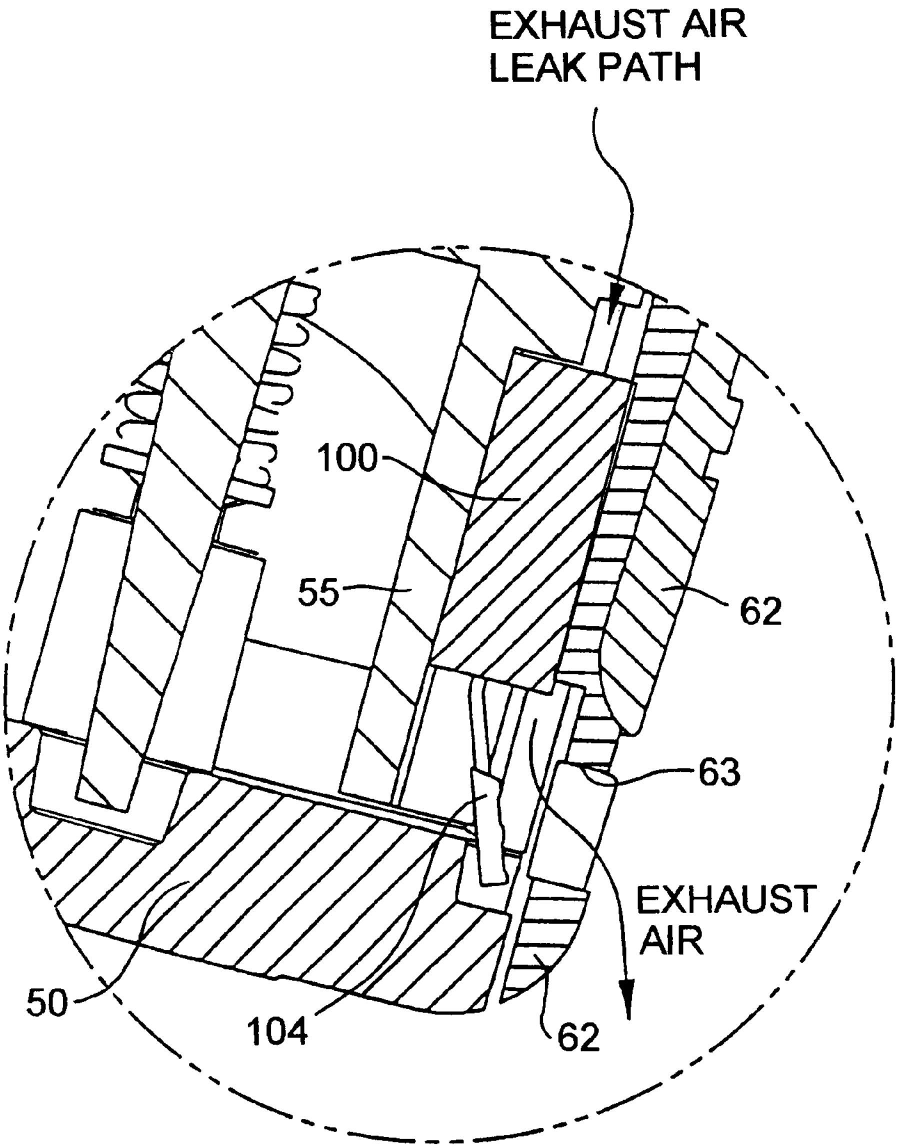
FIG. 4 is a cross-sectional view of an embedded semiconductor chip taken along the sectional line shown in FIG. 1 and designated as "4—4"
Figure 5:
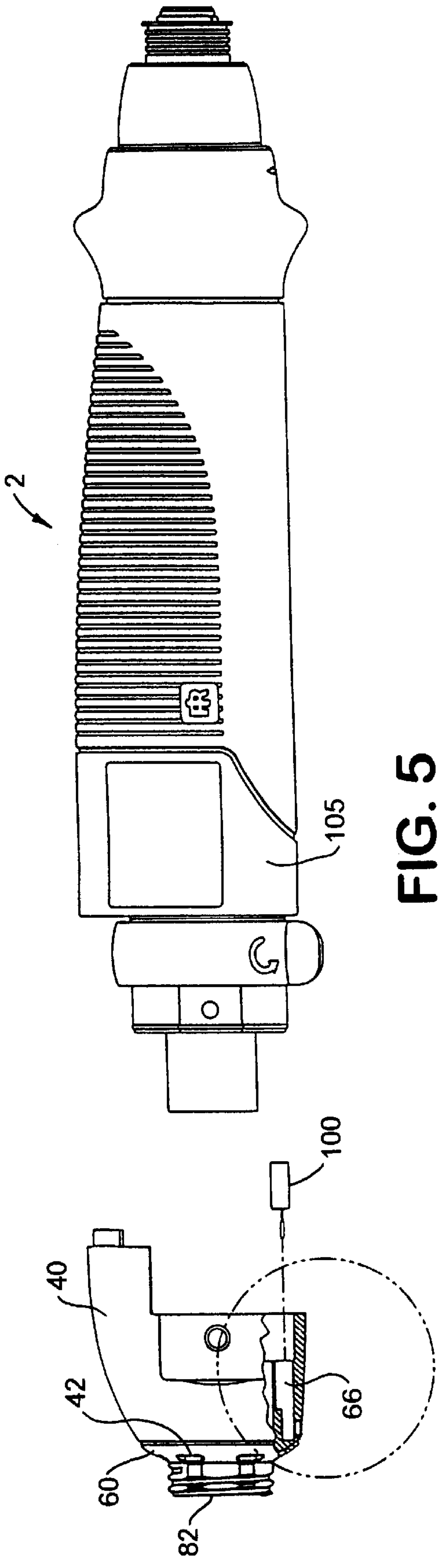
FIG. 5 is a partial cross-sectional and exploded side view showing another preferred embodiment of a pneumatic tool incorporating a pneumatic tool housing and semiconductor chip according to the present invention.

As shown in FIGS. 2 and 3, according to a preferred embodiment of the present invention, a wall 55 attached to center wall 10 is configured to receive electronic device 100. Upon placing and optionally securing electronic device 100 onto wall 55, the speed regulating device 5 is then inserted into handle 62 until electrical contact portions 104 are exposed to the outside of handle 62 through an aperture 63 located therein. In the assembled pneumatic tool 1 as shown in FIG. 4, wall 55 is configured to form a compartment within handle 62 that is in fluid communication with at least a portion of the motive gas stream. Preferably, the compartment has an inlet and an outlet, wherein at least a portion of the motive gas stream enters into the compartment through the inlet and exits through the outlet. During operation of the pneumatic tool, the compartment is designed to provide an exhaust air leak or bleed path such that at least a portion of the exhaust gas stream (which can be compressed air or other motive gas) impinges upon the exposed electrical contact portions attached to the lead or leads of the electronic device to clean them of any dust, dirt, or other contaminating material.

In a preferred embodiment, at least one rib is provided for separating a plurality of electrical leads of an electronic device when mounted in said compartment. In an exemplary embodiment having two leads, shown located in the center of a depression located in end cap 50 is a rib 56 provided to keep electrical input/output leads 101 separated, thereby helping to prevent shorting of the leads with each other.

According to a yet another preferred embodiment of the present invention, shown in FIGS. 5–9 is an in-line, handheld, pneumatic assembly tool 2 having a housing 105 with an exhaust cap 40 having at least one exhaust port 42 located in an exhaust speed control ring 60. A detailed assembly and operation of pneumatic assembly tool 2 is not provided as the actual workings of the tool are not salient to the operation of the embedded electronic device according to the present invention. Rather for a more detailed background and operation of pneumatic assembly tool, reference is made to the pneumatic tool described in commonly assigned and co-pending U.S. patent application Ser. No. 09/515,471, the disclosure of which is incorporated herein by reference. In brief summary, an internal vane motor (not shown) is driven by a motive gas stream provided through a gas inlet 82, which gas after passing through the tool exhausts through an exhaust outlet comprising an exhaust cap 40 having exhaust ports 42.

Figure 6:
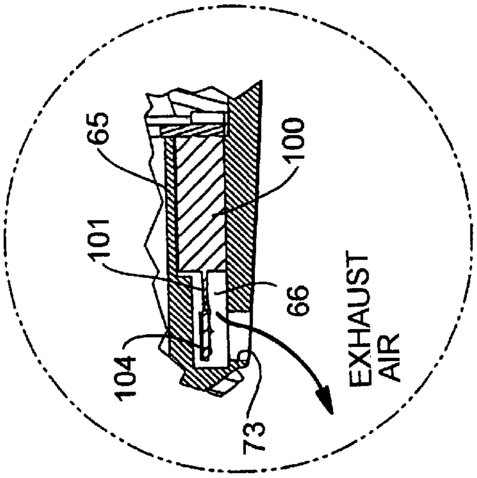
FIG. 6 is an enlarged view showing the compartment illustrated in the circled portion of FIG. 5 after inserting the semiconductor chip therein.
Figure 7:
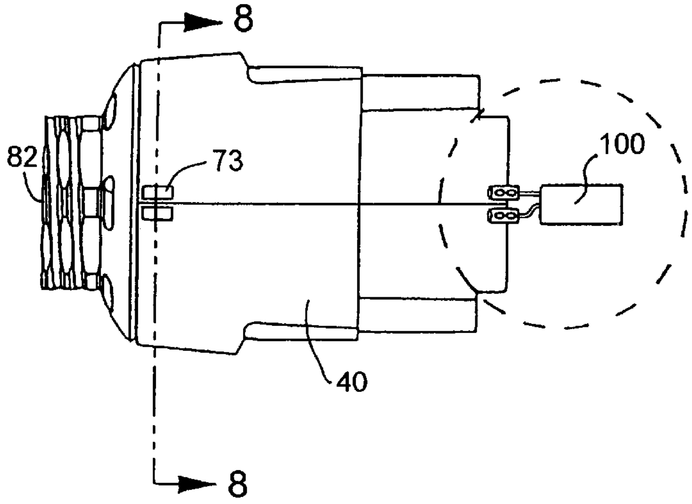
FIG. 7 is a bottom view showing the exhaust cap and semiconductor chip shown in FIG. 5.
Figure 8:
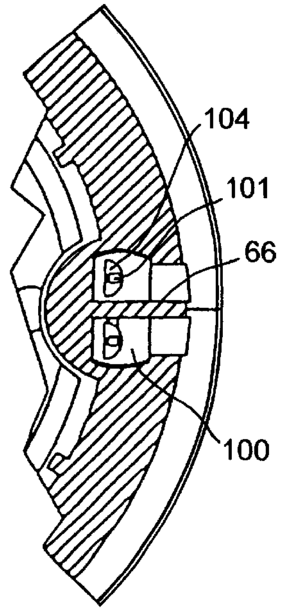
FIG. 8 is a cross-sectional view of the exhaust cap and semiconductor chip taken along the sectional line shown in FIG. 7 and designated as "8—8"

As shown in detail in FIGS. 6 and 8, according to a preferred embodiment of the present invention, a wall 65 attached to the interior of exhaust cap 40 is configured to form a compartment that receives electronic device 100 and is in fluid communication with at least a portion of the motive gas stream. Preferably, the compartment has an inlet and an outlet, wherein at least a portion of the motive gas stream enters into the compartment through the inlet and exits through the outlet. The electrical contact portions of each of the leads are located such that upon inserting said electronic device in the compartment, the electrical contact portion is located in the outlet of the compartment.

Preferably, a rib 66 is located as shown in exhaust cap 40 to keep electrical input/output leads 101 separated, thereby helping to prevent shorting of the leads with each other. In assembling pneumatic tool 2, electronic device 100 shown prior to assembly in FIGS. 5 and 7, 8, and 9, is first inserted into exhaust cap 40 until electrical contact portions 104 are exposed as shown in FIG. 6 through an aperture 73 located in exhaust cap 40. Exhaust cap 40 is then assembled onto housing 105. As shown in FIG. 6, wall 65 is configured to form a compartment within exhaust cap 40 having an exhaust air leak or bleed path such that during operation of-the pneumatic tool, at least a portion of the exhaust gas stream (which can be compressed air or other motive gas) impinges upon the exposed electrical contact portions 104 attached to the lead or leads 101 of the electronic device to clean them of any dust, dirt, or other contaminating material.

According to yet another embodiment of the present invention, shown in FIGS. 10–13 is a handheld pneumatic power tool 110 having a housing 130 attached to a handle 160 in the form of a pistol grip. Preferably, handle 160 is readily detachable so that the grip can be replaced if damaged or interchanged with pistol grips having different ergonomic sizes and shapes, if desired by the operator. An exemplary arrangement is shown in copending and commonly assigned U.S. patent application Ser. No. 09/778,348, which application is incorporated by reference herein. Handle 160 receives housing 130 and has at least one exhaust port 151. An externally threaded inlet bushing 140 is provided that engages internal threads located in a bottom fluid inlet 164 to secure handle 160 to housing 130. Preferably tool 110 includes a top fluid inlet 167 in addition to bottom flu id inlet 164 to provide alternate mounting locations for connecting a motive fluid source (not shown) to an internal fluid motor (not shown). An operating trigger 180 having a trigger stem 175 is located on the front end of handle 160 for operating a valve element such as a tilt valve to control air flow to the fluid motor from the fluid motor source as is known in the art. Trigger 180 is reciprocally mounted in a trigger bore 179 and is sealed to prevent air flow along the bore by means of an O-ring seal 174.

Figure 12:
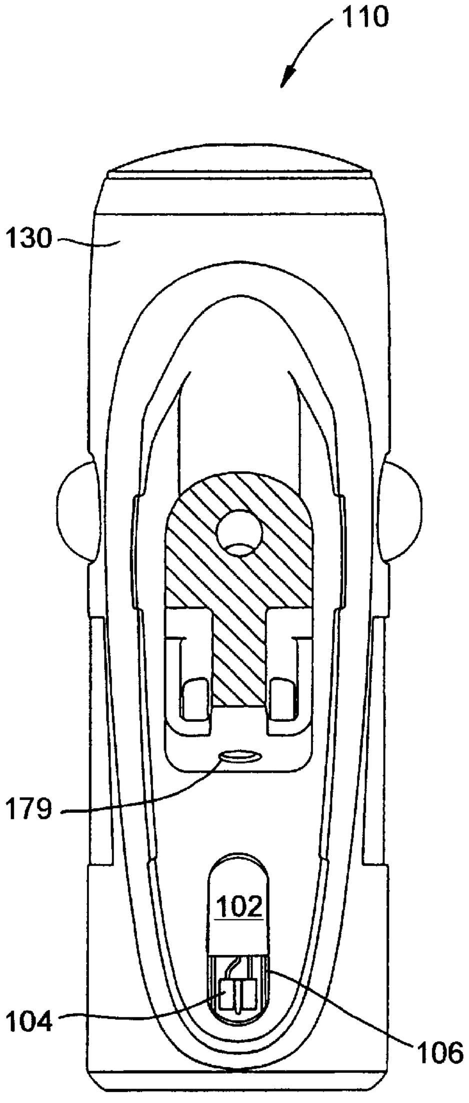
FIG. 12 is a partial cross-sectional bottom view of the pneumatic tool housing and the chip carrying apparatus shown in FIG. 5 with a semiconductor chip mounted therein.
Figure 13:
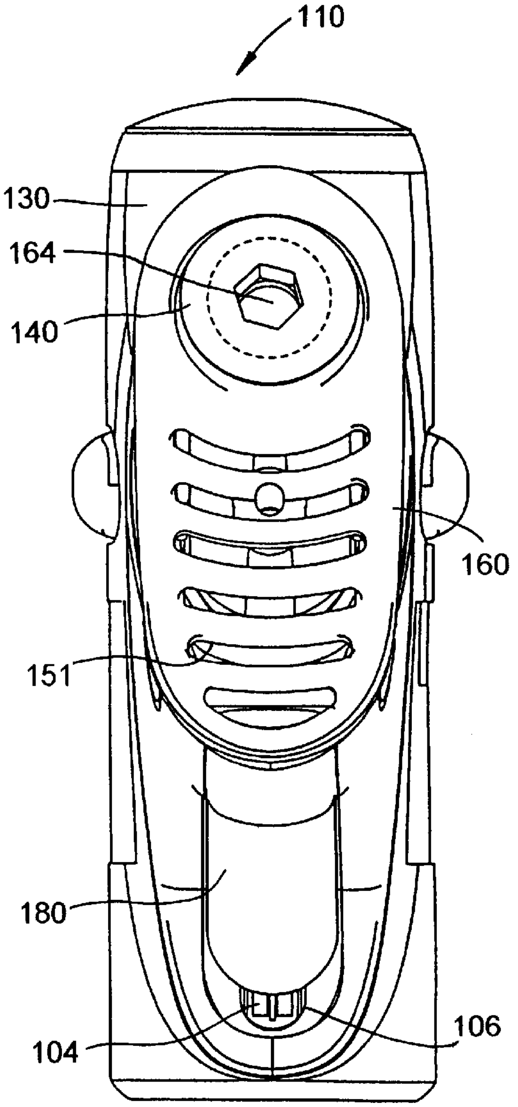
FIG. 13 is a bottom view of the pneumatic tool housing shown in FIG. 12 with the handle and trigger shown in FIG. 5 mounted thereon with the trigger shown in a depressed position.

As shown best in FIGS. 12–13, electronic device 100 is shown located within a compartment 106 placed in housing 130 such that when trigger 180 is in a free position, the electronic device is covered. In this manner the electronic device and its leads are covered by the trigger thereby protecting them from dirt and debris from the outside environment. Access for making electrical contact with the leads of the electronic device is gained by depressing the trigger, as shown in FIG. 13, to expose the electrical contact portions 104 attached to leads 101 of the electronic device for contact with an input/output probe.

Preferably, as shown in FIGS. 10–13 a holder 102 is used to facilitate the easy insertion and, if desired, the easy removal of electronic device 100. As shown in greater detail in FIG. 11, holder 102 is configured to receive electronic device 100 and, preferably, has a rib 103 located longitudinally down the center of holder 102 to keep electrical input/output leads 101 separated, thereby helping to prevent shorting of the leads with each other. Upon sliding electronic device 100 into holder 102, the holder is then mounted into compartment 106 as shown in FIG. 12 by a friction fit or, preferably, using some attachment means such as a temporary or permanent glue. As shown in FIG. 13, trigger 180 and handle 160 are then installed onto housing 130 to complete the assembly of tool 110.

Although shown and described above with respect to the particular pneumatic tools described in the co-pending U.S. patent application Ser. Nos. 09/501,927, 09/515,471, and 09/778,348, it is to be understood that the pneumatic tool components and their workings are not critical to the present invention but are provided as exemplary embodiments of pneumatic tool housings that can be modified according to the present invention. Thus, according to a preferred embodiment of the present invention, any pneumatic or gas driven device can be used in conjunction with an electronic device if the device is located in or on the pneumatic tool housing such that at least a portion of the exhaust gas stream (which can be compressed air or other motive gas) impinges upon the exposed lead or leads of the electronic device to clean them of any dust, dirt, or other contaminating material. According to another preferred embodiment of the present invention, pneumatic tool housings may be provided with service interfaces for performing external data transfer through an access port that is hidden by a part that moves during operation of the tool.

While embodiments and applications of this invention have been shown and described, it will be apparent to those skilled in the art that many more modifications are possible without departing from the inventive concepts herein described. For example, although shown and described above as being used in conjunction with semiconductor chip labels that can serve as a stand alone data base, it is envisioned that the present invention may be utilized with any on-board embedded chips or microprocessors in which the electrical leads are to be protected from dirt or other contaminants that would otherwise prevent electrical contact from being made without prior cleaning of the electrical leads. It is understood, therefore, that the invention is capable of modification and therefore is not to be limited to the precise details set forth. Rather, various modifications may be made in the details within the scope and range of equivalents of the claims without departing from the spirit of the invention.

What is claimed is:

1. A pneumatic tool housing having storage for an embedded electronic device comprising:

a gas inlet for supplying a motive gas stream to said tool, and an exhaust outlet for exhausting said motive gas stream from said tool, and a compartment for an electronic device wherein said compartment is in fluid communication with at least a portion of said motive gas stream and includes an aperture in said housing for exposing an electrical contact portion of an electronic device inserted in said compartment.

2. The pneumatic tool housing having storage for an embedded electronic device as recited by claim 1, said compartment further comprising an inlet and an outlet, wherein said at least a portion of said motive gas stream enters into said compartment through said inlet and exits through said outlet.

3. The pneumatic tool housing having storage for an embedded electronic device as recited by claim 2, wherein said outlet of said compartment comprises at least one rib for separating a plurality of electrical leads of an electronic device when mounted in said compartment.

4. The pneumatic tool housing having storage for an embedded electronic device as recited by claim 2, wherein said housing of said pneumatic tool comprises a pistol-grip handle portion with said outlet of said compartment being an aperture formed in said handle portion.

5. The pneumatic tool housing having storage for an embedded electronic device as recited by claim 2, wherein said pneumatic tool is an inline assembly tool having an exhaust cap with said outlet of said compartment being an aperture formed in said exhaust cap.

6. A pneumatic tool housing having storage for an embedded electronic device comprising:

a gas inlet for supplying a motive gas stream to said tool, and an exhaust outlet for exhausting said motive gas stream from said tool, a compartment for an electronic device, said compartment comprising an inlet and an outlet, wherein at least a portion of said motive gas stream enters into said compartment through said inlet and exits through said outlet, and an electronic device having at least one electrical lead with each electrical lead having a corresponding electrical contact portion, said electrical contact portion being located such that upon inserting said electronic device in said compartment, said electrical contact portion is located in said outlet of said compartment.

7. The pneumatic tool housing having storage for an embedded electronic device as recited by claim 6, wherein said electrical contact portion is a ferrule mounted on said corresponding electrical lead.

8. The pneumatic tool housing having storage for an embedded electronic device as recited by claim 6, wherein said electronic device is a semiconductor electronic chip.

9. A pneumatic tool housing having storage for an embedded electronic device comprising a compartment for an electronic device having at least one electrical lead wherein said compartment includes an aperture in said housing for exposing an electrical contact portion of an electronic device inserted in said compartment, said aperture being covered by a component part of said pneumatic tool during operation.

10. The pneumatic tool housing having storage for an embedded electronic device as recited by claim 9, wherein said component part covering said compartment is an operating trigger mounted on said housing, said operating trigger being disposed such that upon depressing said trigger, at least a portion of said electronic device is exposed.

11. A pneumatic tool housing having storage for an embedded electronic device comprising an electronic device having at least one electrical lead with each electrical lead having a corresponding electrical contact portion, a compartment for said electronic device wherein said compartment is covered by a component part of said pneumatic tool during operation and said electrical contact portion being located such that upon depressing said trigger, said electrical contact portion of said electronic device is uncovered.

12. The pneumatic tool housing having storage for an embedded electronic device as recited by claim 11, further comprising a holder configured to receive said electronic device and mount in said compartment.

13. The pneumatic tool housing having storage for an embedded electronic device as recited by claim 12, wherein said holder comprises at least one rib for separating a plurality of electrical leads of an electronic device when mounted in said compartment.

14. The pneumatic tool housing having storage for an embedded electronic device as recited by claim 11, wherein said electrical contact portion is a ferrule mounted on said corresponding electrical lead.

15. The pneumatic tool housing having storage for an embedded electronic device as recited by claim 11, wherein said electronic device is a semiconductor electronic chip.

16. The pneumatic tool housing having storage for an embedded electronic device as recited by claim 11, wherein said housing of said pneumatic tool comprises a removable pistol-grip handle portion that installs onto said housing.

* * * * *